United States Patent
Jung

(10) Patent No.: US 7,333,427 B2
(45) Date of Patent: Feb. 19, 2008

(54) ROUTER SYSTEM AND METHOD OF DUPLICATING FORWARDING ENGINE

(75) Inventor: Chung-Ji Jung, Sungnam (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 940 days.

(21) Appl. No.: 10/321,520

(22) Filed: Dec. 18, 2002

(65) Prior Publication Data
US 2003/0137980 A1 Jul. 24, 2003

(30) Foreign Application Priority Data
Jan. 21, 2002 (KR) .................................. 2002-3320

(51) Int. Cl.
*H04L 12/26* (2006.01)
(52) U.S. Cl. .................................... 370/220; 370/218
(58) Field of Classification Search ...................... None
See application file for complete search history.

(56) References Cited

U.S. PATENT DOCUMENTS

| | | | |
|---|---|---|---|
| 5,509,123 A | 4/1996 | Dobbins et al. | |
| 5,918,074 A | 6/1999 | Wright et al. | |
| 5,951,649 A | 9/1999 | Dobbins et al. | |
| 6,094,435 A | 7/2000 | Hoffman et al. | |
| 6,160,811 A | 12/2000 | Partridge et al. | |
| 6,259,699 B1 | 7/2001 | Opalka et al. | |
| 6,829,237 B2 * | 12/2004 | Carson et al. | 370/386 |
| 6,879,559 B1 * | 4/2005 | Blackmon et al. | 370/225 |
| 6,885,635 B1 * | 4/2005 | Haq et al. | 370/219 |
| 6,894,970 B1 * | 5/2005 | McDermott et al. | 370/220 |

FOREIGN PATENT DOCUMENTS

EP 1 109 363 A2 8/2000

* cited by examiner

*Primary Examiner*—Huy D. Vu
*Assistant Examiner*—Toan Nguyen
(74) *Attorney, Agent, or Firm*—Robert E. Bushnell, Esq.

(57) ABSTRACT

The present invention discloses a router system receiving data from a predetermined node in networks, and transmitting the data to an appropriate node by switching the data according to routing information, the router system including: a data bus; a routing controller generating routing tables and forwarding tables by operating routing protocols, and controlling mutual interactions and data flows in each devices with the router system; multiple forwarding engines performing functions of forwarding data according to the forwarding tables generated by the routing controller, having the same configurations and functions for mutual substitutions when troubles happens, and establishing main/subordinate relations among the forwarding engines; multiple in/out interfaces connected with the networks and each of the forwarding engines and data bus, performing data interfaces between the networks and the inside of the router system, and functions of switching the data to the networks, each of the forwarding engines, or each of the data bus to transmit the data; and a switch fabric switching the data among the forwarding engines according to the routing tables. Therefore, system resources, such as slots or subordinate forwarding engine, can be saved by preventing unnecessary installation of the subordinate forwarding engine, and loss time for exchanging the troubled forwarding engine.

10 Claims, 7 Drawing Sheets

ROUTER SYSTEM AND METHOD OF DUPLICATING FORWARDING ENGINE

CLAIM OF PRIORITY

This application makes reference to, incorporates the same herein, and claims all benefits accruing under 35 U.S.C. §119 from an application for ROUTER SYSTEM AND METHOD FOR DUPLICATION OF FORWARDING ENGINE UTILIZING earlier filed in the Korean Industrial Property Office on 21 Jan. 2002 and there duly assigned Serial No. 2002-3320.

BACKGROUND OF THE INVENTION

1. Field of the Invention

The present invention relates to a router system, and more particularly to router system duplicating a forwarding-engine and a method of duplicating a forwarding engine.

2. Description of the Related Art

Generally, data communication networks install multiple router systems for transmitting data to destination networking components such as subscribers, switchboards, or networks, according to routing information of the transmission data.

The conventional router system includes a routing controller called a router server, a forwarding engine, a switch fabric, and other components. The router server is a main controller of a router system performing functions of creating routing information, such as a routing table and a forwarding table by operating a routing protocol. The forwarding engine forwards an Internet protocol IP packet based on the forwarding table created in the routing controller. The switch fabric transmits data among the forwarding engines. In other words, the switch fabric transmits data within the router system.

As described in the above statements, each component of the conventional router system is duplicated to cope with various possible troubles according to the situations, such as physical damage in instruments, errors in software, or abnormal data transmission, etc., and thereof to ensure operational reliability.

The conventional duplication method can duplicate extremely limited number, in other words, one or a few, routing controller, switching fabric, and power supplier/temperature controller.

In other words, the router system simultaneously equips the main routing controller and the subordinate routing controller having the same functions with the main routing controller, or simultaneously equips the main switching fabric and the subordinate switching fabric having the same functions with the switching fabric. Therefore, when troubles happen to the switching fabric or the routing controller, the corresponding subordinate systems are operated to substitute the functions and to repair the troubled systems.

The conventional duplication method has difficulties in duplicating the forwarding engines, because many forwarding engines are generally installed within the router system. In other words, many of subordinate forwarding engines are required to substitute for the many forwarding engines according to the conventional duplication method.

However, in the above cases, the router system becomes very expensive to install multiple subordinate forwarding engines. Therefore, it is hard to embody such a router system actually because it is uneconomical.

Additionally, even though subordinate forwarding engines are installed without considering economical problems, additional subordinate forwarding engines are necessary when the router system is expanded. Therefore, the expandability and the flexibility of the router system are debased.

As described in the above statement, the conventional duplication method is hard to provide successful duplicated router system, especially successful duplicated forwarding engines. Therefore, it is necessary to provide a router system and a method of duplicating forwarding engines efficiently through another configurations, and without installing multiple subordinate forwarding engines to the corresponding forwarding engines.

Additionally, according to capacity expansions in each of the forwarding engines due to expansions of data communication demands, the forwarding engines are more important than ever. As a result, successful duplication of the forwarding engines is more requested.

SUMMARY OF THE INVENTION

It is therefore an object of a preferred embodiment of the present invention to provide a router system and a method of duplicating forwarding engine to save system resources, such as slots or subordinate forwarding engines, by preventing pre-installation of unnecessary forwarding engines, and thereof not allowing loss time for exchanging the troubled forwarding engines.

The present invention does not duplicate multiple forwarding engines within a router system mechanically, but controls data paths by utilizing a data bus and an in/out (input and output) interface to substitute another forwarding engines for the troubled forwarding engines.

In order to achieve the above and other objects, a preferred embodiment of the present invention provides a router system receiving data from a predetermined node in networks, and transmitting the data to an appropriate node by switching the data according to routing information, the router system including: a data bus; a routing controller generating routing tables and forwarding tables by operating routing protocols, and controlling mutual interactions and data flows in each devices with the router system; multiple forwarding engines performing functions of forwarding data according to the forwarding tables generated by the routing controller, having the same configurations and functions for mutual substitutions when troubles happen, and establishing main/subordinate (main and subordinate) relations among the forwarding engines; multiple in/out (in and out or input and output) interfaces connected with the networks and each of the forwarding engines and data bus, performing data interfaces between the networks and the inside of the router system, and functions of switching the data to the networks, each of the forwarding engines, or each of the data bus to transmit the data; and a switch fabric switching the data among the forwarding engines according to the routing tables.

Each of the forwarding engines has characteristics of the same hardware configuration and the same software setting value with the other forwarding engine.

Each of the forwarding engines functions forwarding data in main, and performs substitution functions in secondary when other forwarding engines, preset in main/subordinate relations, are in troubles.

A predetermined forwarding engine among the multiple forwarding engines is exclusively used as the subordinate forwarding engine, when data traffics do not exist and all of the forwarding engine do not applied.

The main/subordinate relations are set in software of the routing controller.

Each of the in/out interfaces is connected with the corresponding each of the forwarding engines, and separated from the corresponding each of the forwarding engines physically.

Each of the in/out interfaces includes: a data terminal converting various types of data from the networks to a specified type of data operated within the inside of the router system, performing interfaces between the inside of the router system and the networks; and a data switching unit, connected with the data terminal, the data bus, and each of the forwarding engines, performing mutual selection switching to the data according to controls of the routing controller.

The specified type of data belongs to the third hierarchical layer, Internet protocol IP, of open system interfaces OSI 7 layers.

The mutual selection switching to the data includes: switching to a first direction for transmitting the data to in/out interfaces connected with a subordinate forwarding engine through the data bus according to the main/subordinate relations, when the forwarding engine is in troubles and normal data process is not possible; switching to a second direction for transmitting the data between the data terminal and the forwarding engine mutually, when the forwarding engine is operated normally; and switching to a third direction for transmitting the data from the data bus to the forwarding engine, when the forwarding engine is operated as a subordinate forwarding engine of other forwarding engine according to the main/subordinate relations.

The routing controller detects continuously whether the multiple forwarding engines are operated normally or not.

Another purpose of the present invention provides a method of duplicating a forwarding engine in a router system including multiple forwarding engines, each of the forwarding engines includes the same configuration and function, for forwarding data, multiple in/out interfaces connected with the corresponding each of the multiple forwarding engines for interfacing and switching with the outside communication networks, data bus for connecting mutually with the multiple in/out interfaces, a switch fabric for switching data among the forwarding engines, and a routing controller for controlling mutual interactions and data flows of each of the devices within the router system, the method of duplicating forwarding engine including the steps of: setting main/subordinate relations to the multiple forwarding engines by the routing controller, for preparing abnormal operations of the multiple forwarding engines; detecting continuously by the routing controller whether the forwarding engine is operated normally or not, when the routing system begins to operate; and suspending operations of a troubled forwarding engine by the routing controller, and controlling switching of the in/out interfaces to substitute a subordinate forwarding engine for the troubled forwarding engine according to the setting values of the main/subordinate relations, when a predetermined forwarding engine is in troubles.

The step of setting the main/subordinate relation chooses more than one subordinate forwarding engines by designating a priority to the subordinate forwarding engines.

The present invention does not duplicate multiple forwarding engines within a router system mechanically, but presets principal and subordinate relationships among the forwarding engines for substituting for abnormal functions in each of the forwarding engines mutually. Therefore, when arbitrary forwarding engine has troubles, data bus and in/out interface are controlled and switched to substitute the troubled forwarding engine for other forwarding engine set in the principal and subordinate relationships in prior.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
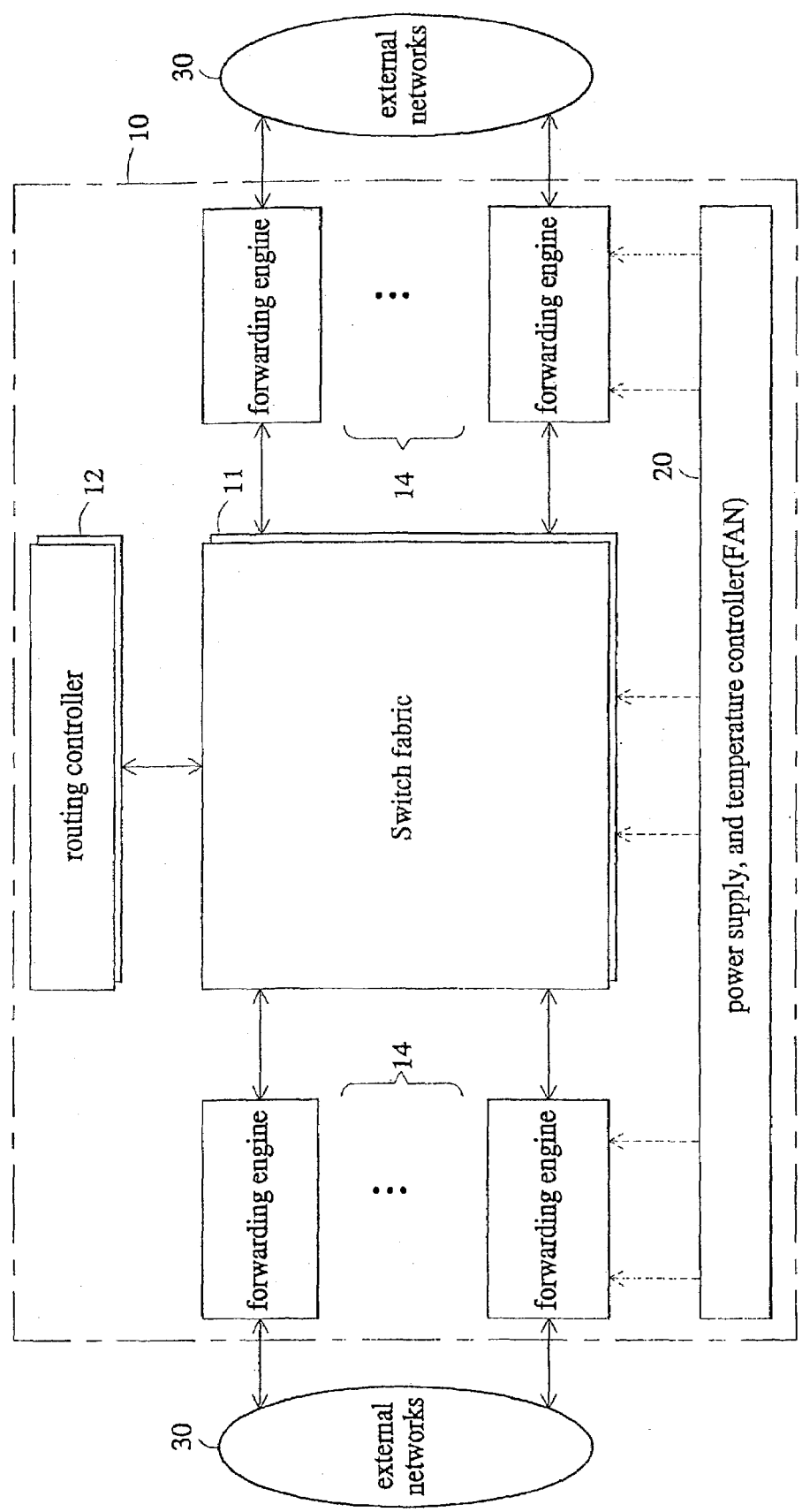
FIG. 1 is a block diagram of the conventional router system.

Turning now to the drawings, referring to FIG. 1, the conventional router system includes a routing controller called a router server 12, a forwarding engine 14, a switch fabric 11, and other components. The router server 12 is a main controller of a router system 10 performing functions of creating routing information, such as a routing table and a forwarding table by operating a routing protocol. The forwarding engine 14 forwards an internet protocol IP packet based on the forwarding table created in the routing controller 12. The switch fabric 11 transmits data among the forwarding engines 14. In other words, the switch fabric 11 transmits data within the router system 10. Sequentially, other components 20 include a power supplier, a temperature controller, and so on.

The above mentioned components 11, 12, 14, and 20 have various additional functions besides the above described functions, but the detail explanations will be omitted because the additional functions are beyond the scope of the present invention.

As described in the above statements, each component of conventional router system 10 is duplicated to cope with various possible troubles according to the situations, such as physical damage in instruments, errors in software, or abnormal data transmission, to ensure operational reliability.

Referring to FIG. 1, the conventional duplication method can duplicate extremely limited number, in other words, one or a few, routing controller 12, switching fabric 11, and power supplier/temperature controller 20.

In other words, router system 10 equips simultaneously routing controller 12 and the subordinate routing controller having the same functions as routing controller 12, or simultaneously equips the switching fabric 11 and the subordinate switching fabric having the same functions as switching fabric 11. Therefore, when malfunction occurs to switching fabric 11 or routing controller 12, the corresponding subordinate systems are operated as substitutes to perform the functions and to repair troubled systems 11 or 12.

Because tens of forwarding engines 14 are generally installed within the router system 10, the conventional duplication method has difficulties in duplicating the forwarding engines 14. In other words, tens of subordinate forwarding engines should be necessary to substitute the tens of the forwarding engines 14 according to the conventional duplication method.

However, in the above cases, the router system 10 becomes very expensive to install multiple subordinate forwarding engines. Therefore, it is hard to embody such a router system 10 actually because it is uneconomical.

Additionally, even though subordinate forwarding engines are installed without considering economical problems, additional subordinate forwarding engines are necessary when the router system 10 is expanded. Therefore, the expandability and the flexibility of the router system 10 are debased.

As described in the above statement, the conventional duplication method is hard to provide successful duplicated router system, especially successful duplicated forwarding engines. Therefore, it is necessary to provide a router system and a method of duplicating forwarding engines efficiently through another configurations, and without installing multiple subordinate forwarding engines to the corresponding forwarding engines.

Additionally, according to capacity expansions in each of the forwarding engines due to expansions of data communication demands, the forwarding engines are more important than ever. As a result, successful duplication of the forwarding engines is more requested.

Reference will now be made in detail to preferred embodiments of the present invention, an example of which is illustrated in the accompanying drawings. Additionally, for the convenience of understanding, the same reference number is given to the same component in each of the accompanying drawings.

Figure 2:
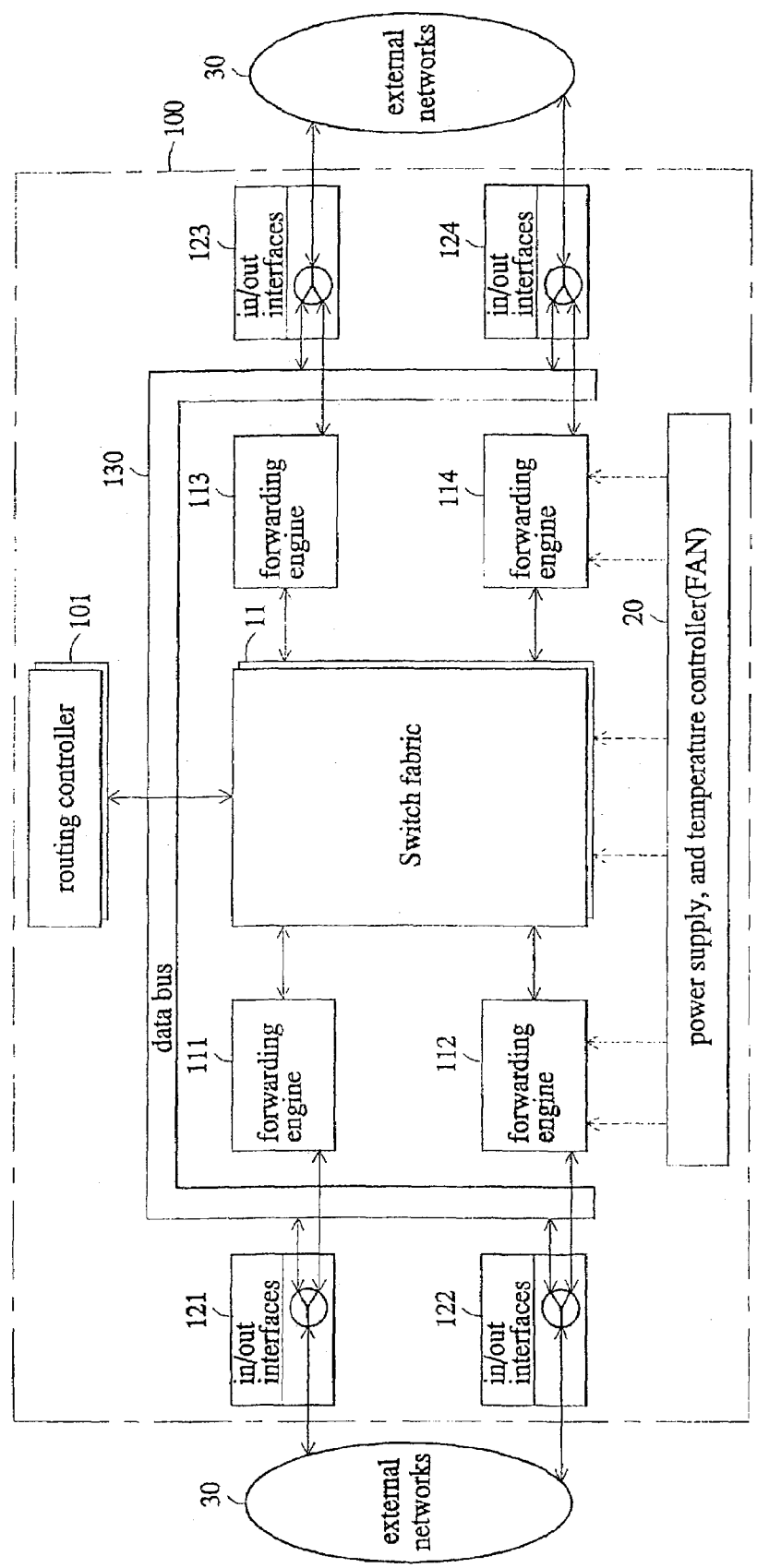
FIG. 2 is a block diagram of a router system according to a preferred embodiment of the present invention.

Referring to FIG. 2, the router system 100 of the present invention comprises a routing controller 101, a switch fabric 11, a data bus 130, multiple forwarding engines 111~114, multiple in/out interfaces 121~124 corresponding to the forwarding engines, and other components 20 such as a power supply and a temperature controller.

Routing controller 101 functions to control mutual interactions and data flow among the components within router system 100, and more particularly, to generate routing information such as a routing table and a forwarding table by utilizing routing protocols.

Additionally, the routing controller 101 functions as establishing primary/subordinate (primary and subordinate, also called main/subordinate (main and subordinate)) relations for each of the forwarding engines 111~114, and as changing the forwarding-table according to main/subordinate (main and subordinate) relations when a specified forwarding engine 111, 112, 113 or 114 falls in trouble.

Multiple forwarding engines 111~114 (111, 112, 113, and 114) function by forwarding data according to the forwarding table generated by routing controller 101, and include first forwarding engine 111, second forwarding engine 112, third forwarding engine 113, and fourth forwarding engine 114, as shown in FIG. 2.

All of the four forwarding engines 111~114 have the same hardware structure and the same software setting value, for example a forwarding table, configuration data, system files, and the main/subordinate relations among the four forwarding engines 111~114 are set mutually. Therefore, when one of the four forwarding engines 111~114 malfunctions, it is possible for one of the other forwarding engines to substitute for the troubled forwarding engine.

In other words, each of the forwarding engines 111~114 performs it's own native functions of forwarding data in main, while each of the forwarding engines 111~114 also performs subordinate functions as a substitute for the malfunctioning forwarding engine.

Therefore, because each of forwarding engines 111~114 can perform main/subordinate functions simultaneously, a conventional subordinate forwarding engine for each of the forwarding engines 111~114 is not necessary. Therefore, the usage of system resources for duplication can be minimized.

Additionally, when less than all of the forwarding engines are applied because only small amounts of data are being processed, a predetermined forwarding engine 111, 112, 113 or 114 can be set as a subordinate forwarding engine.

On the contrary, an administrator sets a predetermined value for mutual main/subordinate functions to each of the forwarding engines 111~114 through software of the router controller 101, and can change the setting value at any time.

The switch fabric 11 switches data flows among the multiple forwarding engines according to the routing table.

Each one of the multiple in/out interfaces 121~124 is connected with the corresponding one of the multiple forwarding engines 111~114. Therefore, the present invention includes a first in/out interface 121 connected with the first forwarding engine 111, a second in/out interface 122 connected with the second forwarding engine 112, a third in/out interface 123 connected with the third forwarding engine 113, and a fourth in/out interface 124 connected with the fourth forwarding engine 114.

Figure 3:
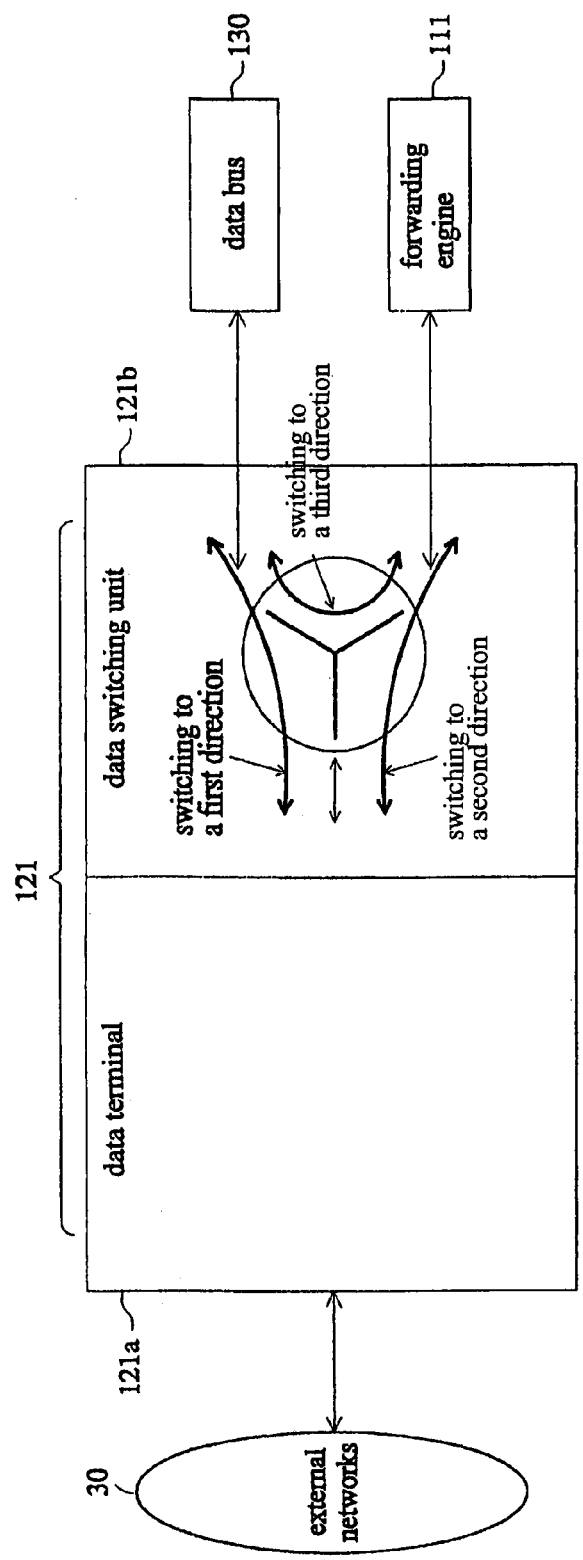
FIG. 3 is a block diagram of a first in/out interface of FIG. 2.

Referring to FIG. 3, the first in/out interface 121 includes a data terminal 121a, a data switching unit 121b. As described in the above statement, the other in/out interfaces 122~124 have the same configuration and functions with the first in/out interface 121.

The data terminal 121a interfaces the inside of the router system 100 with cables connected with the external communication network 30, converts various data from the external communication network 30 to a specified type of data, and transmits the converted data to the inside of the router system 100.

The data switching unit 121b switches data flows to three directions, in other words a first, a second and a third direction, according to the states of a first forwarding engine 111.

Switching to the first direction transmits the data flow from the data terminal 121a to in/out interfaces 122, 123, or 124 of subordinate forwarding engines 112, 113 or 114 through data bus 130 according to the main/subordinate relations, when normal data flows are not possible due to a malfunction of first forwarding engine 111.

Switching to the second direction transmits the data flow from data terminal 121a to first forwarding engine 111, when the forwarding engine 111 is operating normally.

Switching to the third direction transmits the data flow from data bus 130 to first forwarding engine 111, when one of the other forwarding engines 112, 113 or 114 malfunctions and forwarding engine 111 functions as the subordinate forwarding engine as a substitute for the malfunctioning forwarding engine 112, 113 or 114. In this case, the data flow are transmitted to first forwarding engine 111 functioning as a subordinate forwarding engine, instead of the malfunctioning forwarding engine 112, 113 or 114.

Figure 4:
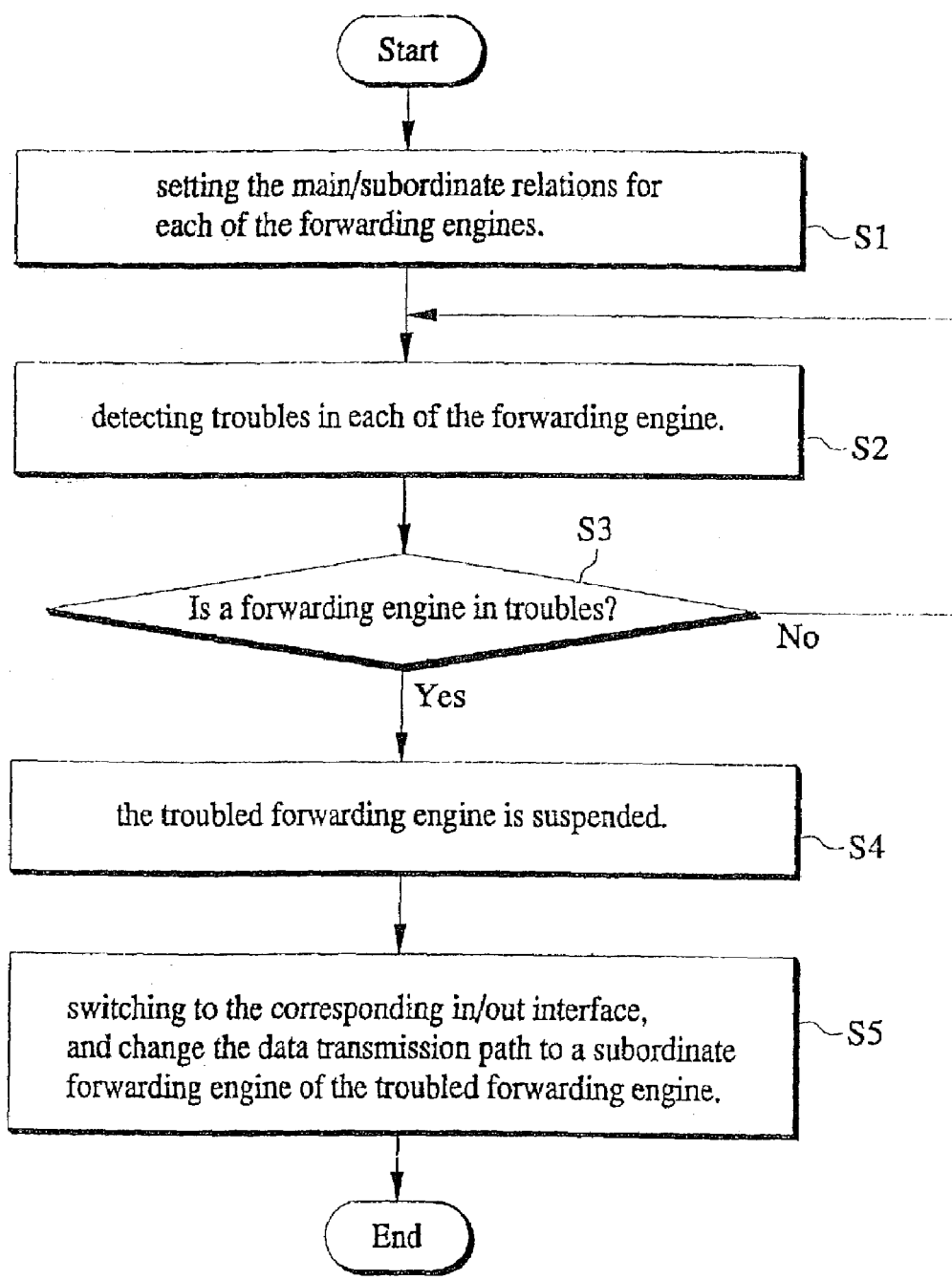
FIG. 4 is a flow chart illustrating a method of duplicating a forwarding engine by utilizing a router system according to the preferred embodiment of the present invention.

FIG. 4 is a flow chart illustrating a duplication method of forwarding engines 111~114 by utilizing such a router system 100.

At first, an administrator presets main/subordinate relations of the forwarding engines 111~114 to a routing controller for duplicating the forwarding engines 111~114 of the router system 100 (step S1).

The preferred embodiment of the present invention sets the fourth forwarding engine as a subordinate forwarding engine of the first forwarding engine 111, and sets the first or the third forwarding engine 113 as a subordinate forwarding engine of the second forwarding engine 112.

In this case, it is preferable to have multiple subordinate forwarding engines of each of the forwarding engines 111~114 by assigning a priority to the multiple subordinate forwarding engines. For example, the second forwarding engine 112 sets the first forwarding engine 111 as a primary subordinate forwarding engine, and the third forwarding engine 113 as a secondary subordinate forwarding engine sequentially. Therefore, when the second forwarding engine 112 is in trouble, the first forwarding engine 111 can be substituted for the second forwarding engine 112. Additionally, when the first forwarding engine 111 is also in trouble, the third forwarding engine 113 can be substituted.

Accordingly, the first forwarding engine 111 and the third forwarding engine 114 perform not only main functions of forwarding data, but also subordinate functions of substituting any troubled forwarding engine 111, 112, 113, or 114 according to the setting value in the routing controller 101.

When main/subordinate relations are preset among the forwarding engines, and the router system 100 begins to operate, each of the in/out interfaces 121~124 and the forwarding engines 111~114 performs normal operations.

Figure 5:
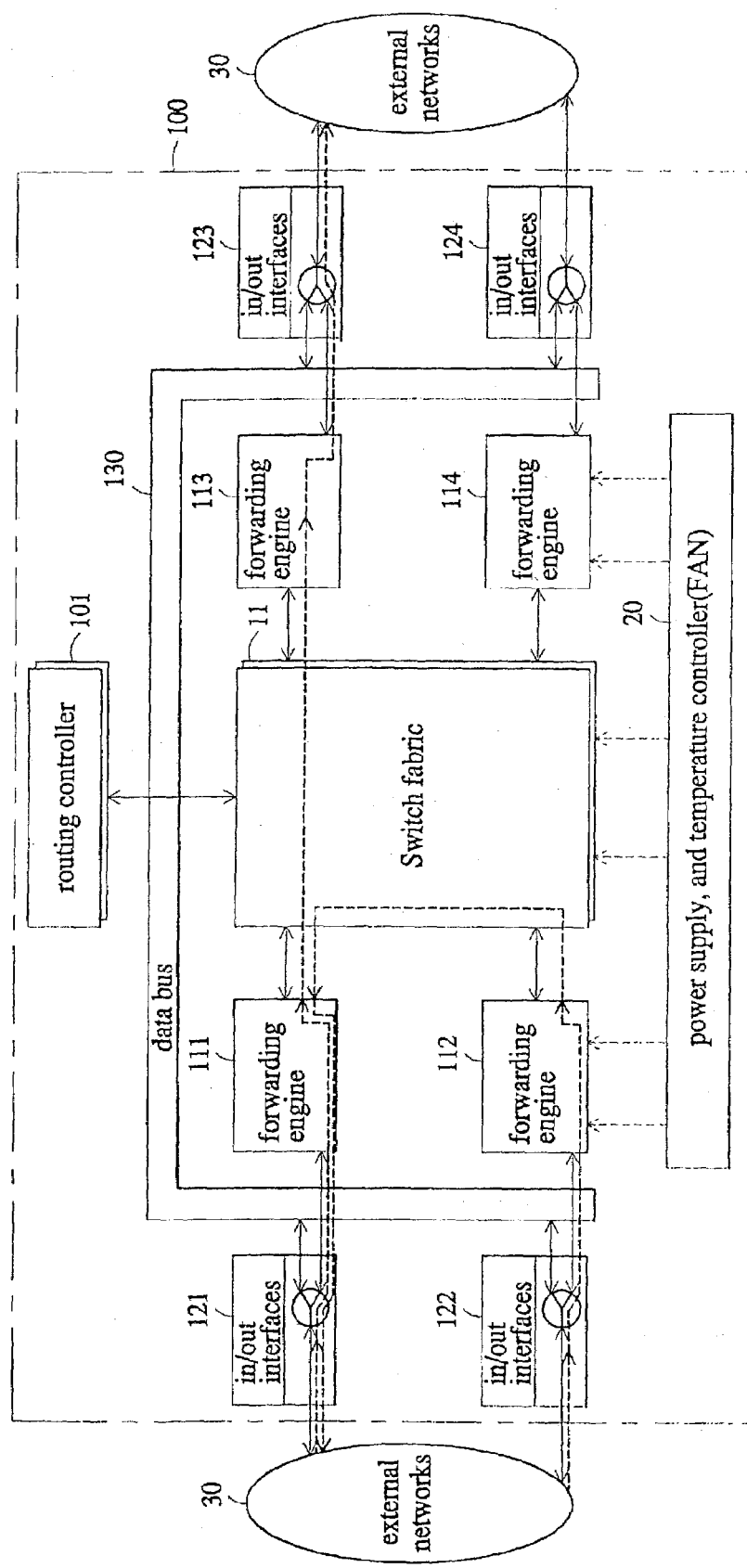
FIG. 5 is a data flow when the router system of the present invention is operated normally.

FIG. 5 is a data flow illustrating the normal case that data from the first in/out interface 121 is transmitted to the third in/out interface, and data from the second in/out interface 122 is transmitted to the first in/out interface 121.

Referring to FIG. 5, data from the first in/out interface 121 is interfaced with the third hierarchical layer, IP packet, of open system interface OSI 7 layers, and transmitted to the first forwarding engine 111 through switching to the second direction. Sequentially, the data is forwarded to the switch fabric 11 by the first forwarding engine 111, switched by the routing information of the packet, and transmitted to the third forwarding engine 113. Finally, the third forwarding engine 113 transmits the data to the outside through the third in/out interface 123.

Additionally, data from the second in/out interface 122 is switched to the second direction to be transmitted to the second forwarding engine 112. Sequentially, the data is forwarded to the switch fabric 11 by the second forwarding engine 112, switched by the routing information of the packet, and transmitted to the first forwarding engine 111. As a result, the first forwarding engine 111 transmits the data to the outside through the first in/out interface 121.

Referring to FIG. 4, when normal operations are performed in the routing system 100, the routing controller 101 detects troubles in each of the forwarding engine 111~114 (step S2). When a specified forwarding engine 111, 112, 113, or 114 is in trouble (step S3), the troubled forwarding engine is suspended (step S4). Sequentially, for a subordinate forwarding engine to be substituted for the troubled forwarding engine according to the main/subordinate relations among the forwarding engines, the routing controller 101 controls switching to the corresponding in/out interface 121, 122, 123, or 124, and change the data transmission path to a subordinate forwarding engine of the troubled forwarding engine 111, 112, 113 or 114 (step S5).

Figure 6:
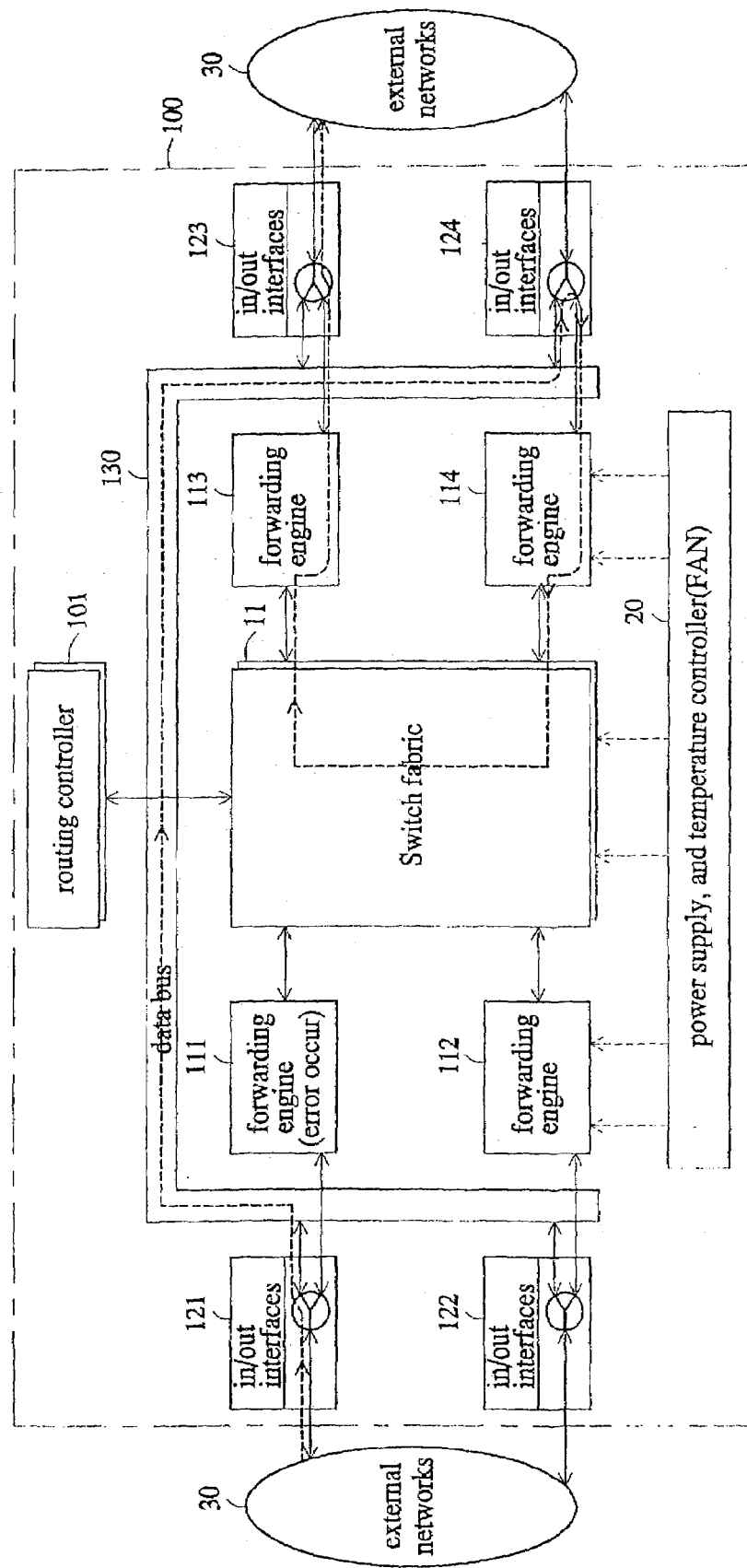
FIG. 6 is a data flow when a subordinate forwarding engine of the present invention is operated.
Figure 7:
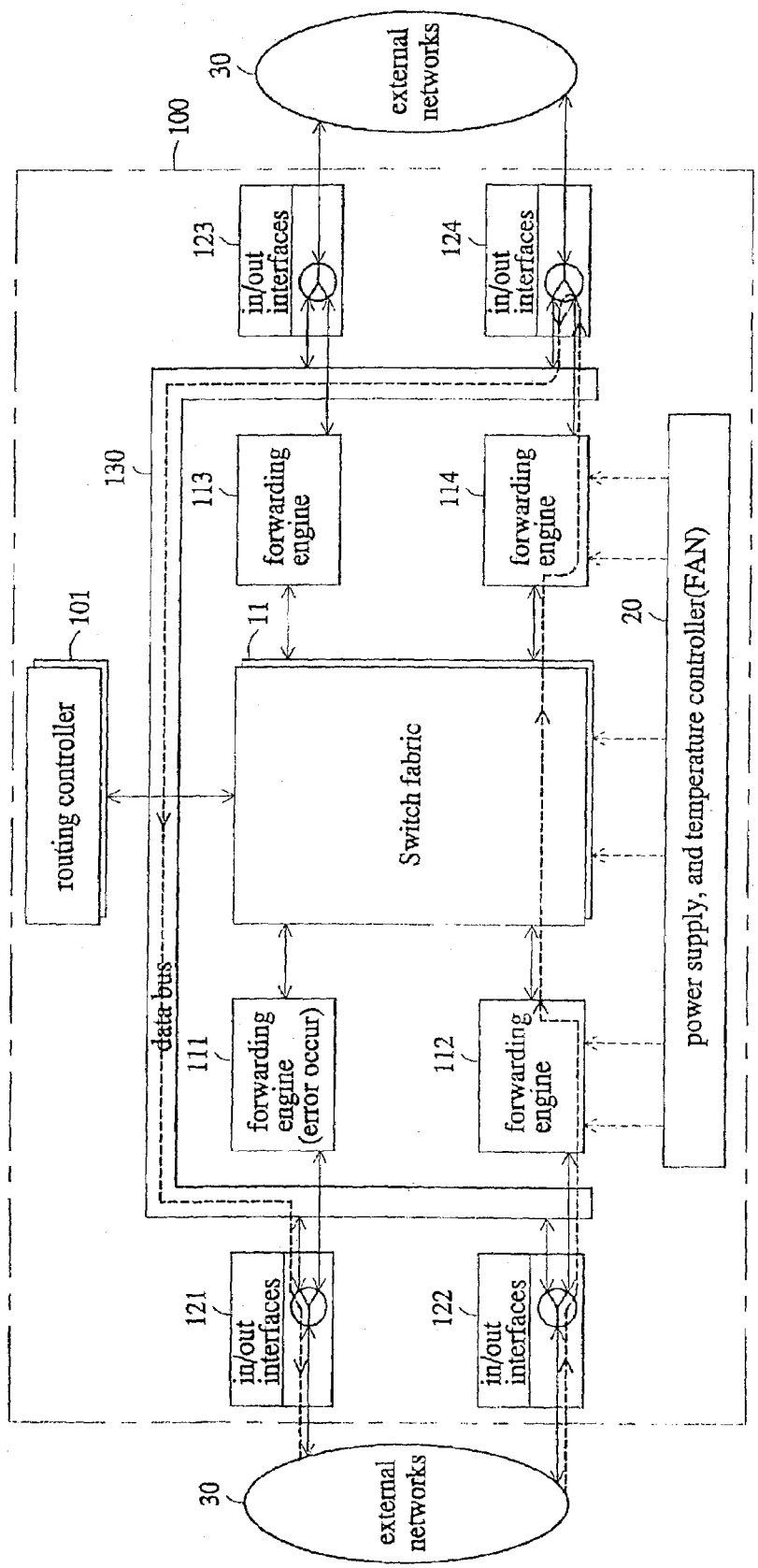
FIG. 7 is other data flow when a subordinate forwarding engine of the present invention is operated.

Each of FIG. 6 and FIG. 7 is a block diagram illustrating data flows when the first forwarding engine is in trouble and is not operating normally.

Referring to FIG. 6, the routing controller 101 controls the first in/out interface 121 to be switched to the first direction, while the first in/out interface 121 is connected with the troubled first forwarding engine 111. In this case, the first direction is the switching direction when the first forwarding engine is in trouble. Additionally, the fourth in/out interface 114 connected to the fourth forwarding engine 114 as the subordinate forwarding engine performs switching to the third direction, the switching direction of subordinate functions.

Therefore, the data from the first in/out interface 121 do not pass the first forwarding engine 111, but pass through the fourth forwarding engine 114 to be transmitted to the third forwarding engine 113 like the case of normal operations.

On the contrary, as shown in FIG. 7, the data from the second in/out interface 122 are transmitted to the second forwarding engine 112 by switching to the second direction, and forwarded to the switch fabric 11 by the second forwarding engine 112.

Because the first forwarding engine 111 is not operated normally because of troubles, the switch fabric 11 does not transmit the data to the first forwarding engine 111, but switches the data to the subordinate forwarding engine, in other words the fourth forwarding engine 114.

The data transmitted to the fourth forwarding engine 114 is transmitted again to the data bus 130 by switching to the third directions of the fourth in/out interface 124. Sequentially, the data bus 130 transmits the data to the first in/out interface 121.

Therefore, the data transmitted to the second in/out interface 122 from the outside is transmitted to the first in/out interface 121 like the case of normal operations, even though the data does not pass the first forwarding engine 111.

As a result, the forwarding engine can be duplicated without following to the conventional method of installing each of the subordinate forwarding engines, having same configurations and functions with the corresponding main forwarding engine, within the router system 100.

As described in the above statements, the present invention does not duplicate multiple forwarding engines within the router system mechanically, but controls the data flows to substitute other forwarding engine for a troubled forwarding engine by utilizing the data bus and the in/out interface. Therefore, system resources, such as slots or subordinate forwarding engine, can be saved by preventing unnecessary installation of the subordinate forwarding engine, and loss time for exchanging the troubled forwarding engine.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A router system receiving data from a predetermined node in networks, and transmitting the data to an appropriate node by switching the data according to routing information, the router system comprising:

a data bus;

a routing controller generating routing tables and forwarding tables by operating routing protocols, and controlling mutual interactions and data flows between devices within the router system;

multiple forwarding engines comprised of all forwarding engines within said router system for performing functions of forwarding data according to the forwarding tables generated by the routing controller, and having common configurations and functions responding to main/subordinate relations established by the routing controller by enabling mutual substitutions of any one of the forwarding engines for any other of the forwarding engines when troubles happen;

multiple input and output interfaces comprised of all input and output interfaces within said router system, said multiple input and output interfaces being connected with the networks, each of the forwarding engines and the data bus, serving as data interfaces between the networks and the inside of the router system, and switching the data between the networks and each of the forwarding engines, and between each of the forwarding engines and the data bus, and between the data bus and the network; and a switch fabric switching the data among the forwarding engines according to the routing tables, with each of the input and output interfaces comprising:

a data terminal converting various types of data from the networks to a specified type of data operated within the inside of the router system, serving as interfaces between the inside of the router system and the networks; and a data switching unit, connected with the data terminal, the data bus, and the corresponding forwarding engine, performing mutual selection switching of the data between the data terminal and the data bus, and between the data bus and the corresponding forwarding engine, and between the data terminal and the corresponding forwarding engine, according to controls of the routing controller, with the mutual selection switching of the data in each of the input and output interface comprising:

switching to a first direction for transmitting the data from the data terminal to input and output interfaces connected with a subordinate forwarding engine through the data bus according to the main/subordinate relations, when the forwarding engine corresponding to the input and output interface malfunctions and normal data process is not possible;

switching to a second direction for transmitting the data between the data terminal and the corresponding forwarding engine mutually, when the corresponding forwarding engine is operating normally; and switching to a third direction for transmitting the data from the data bus to the corresponding forwarding engine, when the corresponding forwarding engine is operated as a subordinate forwarding engine for one of the other forwarding engines according to the main/subordinate relations, wherein the subordinate forwarding engine substitutes for a malfunctioning forwarding engine.

2. The router system according to claim 1, with each of the forwarding engines having a characteristic of the same hardware configuration and the same software setting value with the other forwarding engine.

3. The router system according to claim 1, with the forwarding engines performing a main function of forwarding data, and the forwarding engines performing a secondary function of serving as a substitute for another forwarding engine when the other forwarding engine malfunctions, according to the established main/subordinate relations among the forwarding engines.

4. The router system according to claim 1, with a predetermined forwarding engine among the multiple forwarding engines being exclusively used as the subordinate forwarding engine, when less than all of the forwarding engine are in operation as forwarding engines.

5. The router system according to claim 1, with the main/subordinate relations being stored in software of the routing controller.

6. The router system according to claim 1, with each of the input and output interfaces being operationally connected with a corresponding one of the forwarding engines, and being physically separated from the corresponding one of the forwarding engines.

7. The router system according to claim 1, with the specified type of data belonging to a third hierachical layer, Internet protocol, of open system interfaces seven layers.

8. The router system according to claim 1, with the routing controller detecting continuously whether the multiple forwarding engines are operated normally or not.

9. An apparatus receiving data from a predetermined node in networks, and transmitting the data to an appropriate node by switching the data according to routing information, the apparatus comprising:

a bus accommodating data;

a controller generating routing tables and forwarding tables by operating routing protocols, and controlling mutual interactions and data flows within the apparatus;

a plurality of first units performing a forwarding of data as their main functions according to the forwarding tables generated by said controller, having the same hardware configurations and functions and the same software setting values enabling any one of the first units to serve as a substitute for any other of the first units in accordance with main/subordinate relations established in the software of said controller when any other one of the first units malfunction;

a plurality of interfaces connected with the networks and said bus, each of said interfaces being connected with a corresponding one of said first units to perform data interfaces between the networks and the inside of the apparatus, and functions of switching the data to the networks, each of said first units, or said bus to transmit the data, each of said interfaces being physically separated from the corresponding one of said first units, and each one of said interfaces comprising:

a terminal converting various types of data from the networks to a specified type of data operated within the inside of the apparatus, performing interfaces between the inside of the apparatus and the networks;

a second unit, connected with said terminal, said bus, and each of said first units, performing mutual selection switching of the data according to controls of said controller; and a third unit switching the data among said first units according to the routing tables, with the mutual selection switching of the data by:

switching to a first direction for transmitting the data to said interfaces connected with a subordinate one of said first units through said bus according to the main-subordinate relations, when said corresponding one of the first units malfunctions and normal data processing is not possible;

switching to a second direction for transmitting the data between said terminal and said corresponding one of said first units mutually, when said corresponding one of the first units is operating normally; and switching to a third direction for transmitting the data from said bus to said corresponding one of the first units, when said corresponding one of the first units is operated as a subordinate first unit substituting for a malfunctioning one of the first units according to the main-subordinate relations.

10. The apparatus according to claim 9, with a predetermined first unit among said plurality of first units being exclusively used as the subordinate first unit, when data traffics do not exist and all of said first units are not applied.

* * * * *